US012657921B2

(12) United States Patent
Hughes et al.

(10) Patent No.: US 12,657,921 B2
(45) Date of Patent: Jun. 16, 2026

(54) REALTIME ENVIRONMENTAL MONITORING AND DEVICE CONTROL

(71) Applicant: Ivanti, Inc., South Jordan, UT (US)

(72) Inventors: Ian Hughes, Daresbury (GB); Matthew Pritchard, Daresbury (GB); Joshua Fowell, Daresbury (GB); James Brian, Daresbury (GB)

(73) Assignee: Ivanti, Inc., South Jordan, UT (US)

( * ) Notice: Subject to any disclaimer, the term of this patent is extended or adjusted under 35 U.S.C. 154(b) by 293 days.

(21) Appl. No.: 18/488,399

(22) Filed: Oct. 17, 2023

(65) Prior Publication Data

US 2024/0144691 A1 May 2, 2024

Related U.S. Application Data

(60) Provisional application No. 63/381,999, filed on Nov. 2, 2022.

(51) Int. Cl.
| | |
|---|---|
| *G06V 20/52* | (2022.01) |
| *G06F 9/451* | (2018.01) |
| *G06T 7/20* | (2017.01) |
| *G06V 40/10* | (2022.01) |
| *G08B 21/18* | (2006.01) |

(52) U.S. Cl.
CPC .............. *G06V 20/52* (2022.01); *G06F 9/451* (2018.02); *G06T 7/20* (2013.01); *G06V 40/103* (2022.01); *G08B 21/182* (2013.01)

(58) Field of Classification Search
CPC ...................................................... G06V 20/52
See application file for complete search history.

(56) References Cited

U.S. PATENT DOCUMENTS

| | | | | |
|---|---|---|---|---|
| 12,382,001 | B2 * | 8/2025 | Khadloya | .............. G06V 20/70 |
| 2018/0096601 | A1 * | 4/2018 | Chow | ................... H04W 84/00 |
| 2020/0290608 | A1 * | 9/2020 | Liu | ......................... G08G 1/166 |
| 2022/0169203 | A1 * | 6/2022 | Chen | ..................... H04N 23/90 |
| 2023/0286527 | A1 * | 9/2023 | Emura | .................. B60W 50/14 |

FOREIGN PATENT DOCUMENTS

WO      WO-2022034389 A1 *   2/2022   ......... G06F 18/2413

* cited by examiner

*Primary Examiner* — Di Xiao

(57) ABSTRACT

A method of real time monitor and control of a dynamic environment may include obtaining image data from a camera system directed towards a portion of a dynamic environment. The method may include identifying a first object and a second object in the image data. The method may include analyzing motion of the first object relative to the second object. The method may include identifying that a defined circumstance exists in the dynamic environment based on presence of a property of in the analyzed motion that exceeds an operating threshold. Responsive to the defined circumstance existing in the dynamic environment, the method may include generating a control signal that is configured to mitigate the defined circumstance and communicating the control signal to a device related to the first object such that an operational state of the first object is modified to bring the property within the operating threshold.

18 Claims, 9 Drawing Sheets

| Identify A First Frame | 702 |

| Determine One Or More Object Types | 704 |

| Determine A First Position | 706 |

| Identify A Second Frame | 708 |

| Verify The Identity Of The Objects | 710 |

| Determine A Second Position | 712 |

| Determine A Difference | 714 |

REALTIME ENVIRONMENTAL MONITORING AND DEVICE CONTROL

CROSS-REFERENCE TO RELATED APPLICATION

This application claims priority to and benefit of U.S. Provisional Application No. 63/381,999, filed Nov. 2, 2023, which is incorporated herein by reference in its entirety.

FIELD

The present disclosure generally relates to real time environmental monitoring and device control. Some embodiments are directed to systems and methods implemented to monitor a warehouse or similar environment and control operations of devices within the warehouse responsive to image data.

BACKGROUND

A warehouse may include shelves, boxes, containers, or any other storage locations in which items placed in the warehouse may be stored. The warehouse may provide a place in which items that include raw materials, manufactured products, intermediate components, or any other items may be stored before sending the items out for distribution as the items become needed or requested. Warehouse operators may be instructed to perform warehouse operations that involve adding items to or removing items from one or more of the storage locations of the warehouse. For example, the warehouse operators may move specific items to a loading dock responsive to receiving a request for procurement of the specific items. Some warehouses may include warehouse operators performing manual tasks relating to movement of items within the warehouse, while other warehouses may include automated transportation of items through use of automated conveyors, pallet movers, cranes, or any other tools.

Warehouses that include automated transportation of items may include numerous sensors and computer systems that operate to facilitate accurate transportation of items. Additionally or alternatively, such warehouses may include human warehouse operators who perform some tasks in the warehouse that have not been automated. Consequently, it is important in these settings for the automated operations of the warehouse to be safe for the human warehouse operators.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of the invention, an embodiment may include a method of real time monitor and control of a dynamic environment may include obtaining image data from a camera system directed towards a portion of a dynamic environment. The method may include identifying a first object and a second object in the image data. The method may include analyzing motion of the first object relative to the second object. The method may include identifying that a defined circumstance exists in the dynamic environment based on presence of a property of in the analyzed motion that exceeds an operating threshold.

Responsive to the defined circumstance existing in the dynamic environment, the method may include generating a control signal that is configured to mitigate the defined circumstance and communicating the control signal to a device related to the first object such that an operational state of the first object is modified to bring the property within the operating threshold. The method may include receiving operation information from a user device associated with a first user who is at least temporarily present in the dynamic environment. The operation information may include data reflecting performance of an operation by the first user in the dynamic environment, and the identifying that the defined circumstance exists includes correlating the operation information with the first and the second objects defined in the image data. The control signal may include a modification to a sequence of screens that direct the operation and the dynamic environment includes a smart warehouse, a medical facility, or a shopping center. The analyzing the motion may include motion detection, object tracking, human detection, object proximity assessment, or quantity detection. The analyzing the motion may include identifying a first frame of the image data that includes the first object and the second object; determining an object type of the first object and the second object; determining a first position of the first object relative to the second object in the first frame; identifying a second frame of the image data that includes the first object and the second object; verifying the identity of the first object and the second object in the second frame; determining a second position of the first object relative to the second object in the second frame; and determining a difference between the first position and the second position of the first object relative to the second object. The second object may include a background object. The first object and the second object may be identified by an artificial intelligence (AI) engine. Additionally or alternatively, identifying that the defined circumstance exists may be performed using the AI engine. The AI engine may be trained based at least partially on a camera feed from one or both of other periods of time at the dynamic environment and other warehouse operations. The operating threshold may include one or more or a combination of a maximum spacing distance between the first object and the second object, a maximum spacing distance between the first object and the second object on a warehouse shelf, a minimum spacing distance between a first user and the first object or the second object, a social distance between users in the dynamic environment, a maximum load imposed by the first object on the second object, a minimum load imposed by the first object on the second object, a minimum movement speed of the first object relative to the second object, and a minimal free space relative to the first object or the second object.

An additional aspect of an embodiment includes a non-transitory computer-readable medium having encoded therein programming code executable by one or more processors to perform or control performance at least a portion of the method described above.

Yet another aspect of an embodiment includes a computer device. The computer device may include one or more processors and a non-transitory computer-readable medium. The non-transitory computer-readable medium has encoded therein programming code executable by the one or more processors to perform or control performance of one or more of the operations of the methods described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
FIG. 1 is a diagram of an example operating environment in which some embodiments of the present disclosure may be implemented.

Embodiments of the present disclosure relate to systems and methods of real time monitor and device control in dynamic environments such as warehouses and medical facilities. In the dynamic environments, multiple objects such as equipment, items of inventory, and humans generally move in unpredictable or difficult-to-predict ways, which may introduce safety concerns and inefficiencies. In conventional systems, these safety issues and inefficiencies persist. For instance, camera systems are generally implemented for security. However, video data from these camera systems are not further processed with other environmental sensor data to control objects in real time.

Some embodiments of the present disclosure are implemented in these dynamic environments. For instance, some embodiments may be implemented perform automated processes to identify defined or particular circumstances in which these safety concerns and inefficiencies are present. Additionally, some embodiments may generate signals to control objects in real time to improve safety, efficiency, and supplement item tracking and device management systems.

The automated processes may implement sensors and devices such as internet of things (JOT) sensors and devices located in the dynamic environment. The sensors may be configured to collect data indicative of physical phenomena in the dynamic environment. The sensors or sensor gateways may send the data to a monitor and control system that processes the data to identify a defined circumstance and to control an object to mitigate or address the defined circumstance. In addition, the data may be implemented to modify software that directs a manual process in the dynamic environment, which may improve efficiency of the manual process.

For example, a camera system may be deployed in a dynamic environment such as a warehouse. The camera system may be configured to capture video data of a portion of the warehouse including two or more objects. The camera system may be communicatively coupled to the monitor and control system such that video data of the camera system can be communicated to and processed by the monitor and control system. The video data may be processed to identify objects such as humans and warehouse equipment and to identify one of the defined circumstances involving the objects. An example of the defined circumstance in the warehouse environment may include two humans that are too close to one another (e.g., within social distance), an impact between a human and warehouse equipment, interference between pieces of warehouse equipment, motion of an item during a supply chain operation, other circumstances involving objects in the warehouse, or combinations thereof. Responsive to the identification of the defined circumstance, the monitor and control system generates and implements a control signal to modify or affect the defined circumstance. For instance, the monitor and control system may communicate a command to disable or otherwise operate a piece of equipment, notify or alarm a human, generate an entry in tracking system related to an item, update a managed device, etc. Additionally, the monitor and control system may process the sensor data to supplement a software implemented to direct or assist a supply chain operation.

Additionally, in some embodiments, the camera systems may collect image data (e.g., a video stream) and provide the image data to an artificial intelligence (AI) engine of the monitor and control system. The AI engine may be configured to determine properties relating to the dynamic environment based on the collected image or video feeds. For example, the AI engine may be configured to detect motion of humans and objects or to distinguish between humans and objects captured in the image data. Additionally, the AI engine may detect patterns of movement and relate the patterns to the humans and objects. The AI engine may be configured to develop the defined circumstances and to at least partially identify conditions during which the defined circumstances are present in real time as well as generation of control signals to address or mitigate the defined circumstance.

In some implementations, the monitor and control system may reduce reliance on human supervision and/or supplement software that directs manual operations in the dynamic environment. For instance, an example supply chain software may include terminal emulation software such as Velocity® offered by Ivanti® Wavelink®. The terminal emulation software reformats data from a telnet server to facilitate supply chain operations in a warehouse environment (e.g., picking items, placing and moving items, receiving and distributing items, etc.). The terminal emulation software may be implemented on a rugged device such as a bar code scanning device. The monitor and control system may interface with the terminal emulation software. For instance, the monitor and control system may alarm or notify a warehouse operator using the emulation software. In addition, the monitor and control system may supplement the emulation software by tracking movement of items in the warehouse, which may reduce supply chain operations performed by the human operators.

The AI engine may, among other things, provide more accurate information regarding warehouse operations while reducing input from human operators. Additionally or alternatively, processes that involve human operators may be simplified or safety of these processes may be improved.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 is a diagram of an example operating environment 100 in which some embodiments of the present disclosure may be implemented. The operating environment 100 of FIG. 1 includes a dynamic environment 107 that is monitored and controlled by a monitor and control module 105 (hereinafter, "MC module 105") of a system device 104. A camera system 102 may be deployed in the dynamic environment 107 to monitor objects in the dynamic environment 107 such as users 112A and 112B (generally, user 112 or users 112), a user device 113, an environment item 115, and an environment device 109. The camera system 102 may communicate image and/or video data (hereinafter, "image data") to the system device 104. The MC module 105 may use the image data to identify a defined circumstance involving one or more of the objects (e.g., 112, 113, 109, and 115) in the dynamic environment 107. The MC module 105 may additionally generate control signals which may be communicated to the environment device 109 and/or the user device 113 to mitigate or otherwise address the defined circumstance. Throughout the present disclosure, the defined circumstance may include a configuration or arrangement of the objects in the dynamic environment 107 that triggers an action or response by the MC module 105. In some embodiments, the defined circumstance is related to a property of that is quantified through analysis of the image data and a relationship between the property and an operating threshold (hereinafter, "threshold") assigned to the property. For instance, the property may be a distance between objects and the threshold may include a minimum distance between the objects. Responsive to the property being below the threshold, the MC module 105 may generate and communicate a control signal to prevent the distance from decreasing. Additional examples of the defined circumstances are provided throughout the present disclosure.

The system device 104 may include an AI engine 106. The MC module 105 may be connected to the AI engine 106. The AI engine 106 may receive the image data from the camera system 102. The AI engine 106 may apply one or more machine learning algorithms to the image data, which may be used to develop the defined circumstances, identify the objects of the dynamic environment 107, determine whether one or more thresholds related to the defined circumstances are present, generate control signals, determine a property and a threshold related to the property, etc. The AI engine 106 may accordingly derive and communicate data and information with the MC module 105 related to the monitor and the control of the dynamic environment 107.

For instance, the dynamic environment 107 may include a smart warehouse. The camera system 102 of the smart warehouse may be configured to collect information relating to operations that occur in at least a part of the smart warehouse. For instance, the camera system 102 may be directed to a particular region in the smart warehouse. The image data captured by the camera system 102 may be obtained and processed by the AI engine 106. For example, the AI engine 106 may use the image data to identify properties of the smart warehouse or objects therein. In particular, the AI engine 106 may identify the users 112, determine location of the users 112 relative to one another or to an environment device 109, determine locations of the environment item 115 relative to one of the users 112 or the environment device 109, etc.

The camera system 102, the system device 104, the user device 113, the environment device 109, the AI engine 106 and some embodiments of the environment item 115 may be communicatively coupled with one another via a network 108. For instance, the camera system 102, the system device 104, the user device 113, the environment device 109, the AI engine 106, some embodiments of the environment item 115, or some combinations may be configured to communicate data and information such as the image data via the network 108 and may communicate control signals and status information via the network 108. Each of these components are introduced in the following paragraphs.

The network 108 may include one or more wide area networks (WANs) and/or local area networks (LANs) that enable the components (e.g., 102, 104, 113, 109, 106, and 115) of the operating environment 100 to communicate with each other. In some embodiments, the network 108 may include the Internet in which communicative connectivity between the components of the operating environment 100 is formed by logical and physical connections between multiple WANs and/or LANs. Additionally or alternatively, the network 108 may include one or more cellular radio frequency (RF) networks, one or more wired networks, one or more wireless networks (e.g., 802.xx networks), Bluetooth access points, wireless access points, Internet Protocol (IP)-based networks, or any other wired and/or wireless networks. The network 108 may also include servers that enable one type of network to interface with another type of network.

The user device 113 may include a hardware-based computing device configured to communicate with at least some of the other components of the operating environment 100. The user device 113 may include a rugged device such as a barcode scanner, a smart or mobile device (which may include a scanner), a printer, a point of sale (POS) device, a tablet computing device, a laptop computing device, etc. In some embodiments, a first user 112A may be associated with the user device 113. For instance, the first user 112A may log into the user device 113 prior to use or may be assigned to the first user 112A based on role, function, etc.

The user device 113 may have loaded thereon an environment module 111. The environment module 111 may be implemented to direct or assist the user 112 in management of the dynamic environment 107. In some embodiments, the environment module 111 may include a terminal emulation application or a browser-based inventory application, which may direct or track the first user 112A through operations of the dynamic environment 107. The environment module 111 may communicate operation information to the components of the operating environment 100 via the network 108. For instance, the operations (e.g., pulling operations in a warehouse, administering a medical treatment, gathering items in a shopping center, etc.) performed by the first user 112A may be tracked as well as changes to screens presented by the environment module 111 may be tracked. The operation information may reflect performance of the operations by the first user 112A and may be communicated to the MC module 105 and the AI engine 106. The operation information may be correlated to the image data.

Additionally, in some embodiments, the environment module 111 may communicate location information (e.g., GPS data, WiFi-based data, etc.) to the system device 104 and/or the AI engine 106. The location information may be used by the MC module 105 and/or the AI engine 106 to monitor a position of the user device 113 in the dynamic environment 107.

The environment module 111 may also receive control and notification signals from the system device 104. For instance, alarms may be communicated to the user device 113, which may be displayed or otherwise communicated (e.g., audibly or via vibration) to the first user 112A. Additionally, a control signal may modify a screen displayed on the environment module 111. For instance, without the control signal, the environment module 111 may present a first sequence of screens, which may include a first screen, followed by a second screen, and then followed by a third screen. The control signal may modify the first sequence such that the first screen is immediately followed by the third screen. The modifications to the environment module 111 may improve efficiency of an operation in the dynamic environment 107 or may customize the operation for the first user 112A.

The users 112 may include individuals or groups of individuals who are at least temporarily present in the dynamic environment 107. In some embodiment, the users 112 may be associated with the user device 113. The users 112 may include warehouse operators, medical professionals, inventory management personnel, unauthorized individuals (e.g., those posing a security risk or an individual unfamiliar with the dynamic environment 107), a customer, and the like.

The AI engine 106 and the system device 104 may be configured to identify the users 112 in the dynamic environment 107. For instance, the camera system 102 may communicate the image data, which may include images of the users 112. The AI engine 106 and/or the MC module 105 may identify portions of the image data that include the users 112 and determine a number of the users 112 in the dynamic environment. Additionally, the AI engine 106 and or the MC module 105 may identify positional information such as distances, changes in distances, patterns of distances, or combinations thereof between the users 112, between one or both of the users 112 and the environment item 115 or the environment device 109, and the like. Additionally or alternatively, the positional information may also be correlated with data and information of the environment module 111. For instance, the MC module 105 and/or the AI engine 106 may track changes to screens presented in the environment module 111 with the positional information of the users 112.

The environment item 115 may include an object that is positioned at least temporarily in the dynamic environment 107. Some examples of the environment item 115 may be a piece of inventory (e.g., a box, a shelf, a container, etc.) in a dynamic warehouse environment, medication or medical equipment in a dynamic medical facility environment, an item for purchase or sale in a dynamic shopping environment, etc.

Some examples of the environment item 115 may be communicatively coupled to the system device 104 and/or the AI engine 106 via the network 108. For instance, these and other embodiments may include a sensor such as an internet of things (IOT) device that communicates a signal or enables passive tracking of the environment item 115. In these and other embodiments, the positional information of the environment item 115 may be based on the signal communicated to the MC module 105 and/or the AI engine 106, processing the image data captured by the camera system 102, processing the image data along with information communicated by the environment module 111, or combinations thereof.

Some examples of the environment item 115 may not communicate signals via the network 108. In these and other embodiments, the positional information related to the environment item 115 may be generated based the image data captured by the camera system 102, processing the image data along with information communicated by the environment module 111, or combinations thereof.

The environment device 109 includes a hardware-based computing device. The environment device 109 may be configured to communicate with one or more of the components of the operating environment 100 via the network 108. The environment device 109 is at least temporarily positioned in the dynamic environment 107. For instance, the environment device 109 may enter the dynamic environment 107 that is monitored by the camera system 102. The MC module 105 and/or the AI engine 106 may identify the environment device 109 and determine the positional information of the environment device 109. Additionally, the MC module 105 and/or the AI engine 106 may determine the positional information related to the users 112, the environment item 115, etc.

The camera system 102 may include one or more camera sensors that are configured to obtain image data. For instance, the camera system 102 may include a closed circuit television (CCT) system, a wired or wireless digital camera system, a thermal imaging system, or some combination thereof.

The camera system 102 may be configured to collect an image feed or a video feed of one or more regions in the dynamic environment 107. For example, in embodiments in which the dynamic environment 107 includes a smart warehouse, the camera system 102 may be directed to monitor a shelf, which may be an example of the environment device 109. The camera system 102 may monitor the users 112 as they add or remove items, which may be examples of the environment item 115, from the shelf. Additionally or alternatively, the camera system 102 may be configured to monitor a path in the smart warehouse through which the users 112 frequently travel, a forklift operating zone, any other regions associated with the smart warehouse, or some combination thereof.

In some embodiments, the camera system 102 may be configured to capture a snapshot of one or more regions of the dynamic environment 107 at specific time intervals. In these and other embodiments, the image data may include a chronological sequence representative of the regions. Additionally or alternatively, the camera system 102 may record a video constantly or at specific time intervals for a duration representative of the regions. The camera system 102 may communicate the image data to the AI engine 106 and/or the system device 104.

The system device 104 may include a hardware-based computer system that is configured to communicate with other components of the operating environment 100. The system device 104 may be implemented to monitor and control the dynamic environment 107. Additionally, in some embodiments, the system device 104 may be implemented to manage one or more devices (e.g., 113 and 109). For instance, the system device 104 may perform on-premises or SAAS-based management operations such as service management, device management, patch management, etc.

The system device 104 includes the MC module 105 and the AI engine 106. The AI engine 106 is configured to implement one or more advanced algorithms to identify patterns in the image data and operational information from the environment module 111. In some embodiments, the AI engine 106 may implement machine learning in neural networks or deep learning algorithms with multiple layers. The AI engine 106 may be trained based on the image data as well as thresholds input by administrators, or data from similar dynamic environments 107.

The MC module 105 may be configured for real time monitor and control of the dynamic environment 107. The MC module 105 may obtain image data from the camera system 102 directed towards at least a portion of the dynamic environment 107. The MC module 105 may identify one or more objects (e.g., 112, 113, 115, and 109) in the image data. The MC module 105 may identify that a defined circumstance exists in the dynamic environment 107 based on presence of a property of in the image data that exceeds a threshold. Responsive to the defined circumstance existing in the dynamic environment 107, the MC module 105 may generate a control signal that is configured to mitigate the defined circumstance. The MC module 105 may communicate the control signal to a device (e.g., 113, 109, and 115) related to one or more of the objects such that an operational state of the device or the related object(s) is modified to bring the property within the threshold.

Accordingly, the MC module 105 and the AI engine 106 may be configured to analyze the image data and identify properties relating to operations in the dynamic environment 107. In some embodiments, the MC module 105 and the AI engine 106 may identify a property by analyzing changes between two or more frames of the image or video feed. Additionally, the MC module 105 and the AI engine 106 may determine whether a value of the property exceeds a threshold.

One or more operations of the real time monitor and control of the dynamic environment 107 may be implemented by the MC module 105, the AI engine 106, or a combination thereof. For instance, the AI engine 106 may identify the one or more objects and/or identify that a defined circumstance exists in the dynamic environment 107. Based on the properties determined from the image data and associated thresholds, the MC module 105 and/or the AI engine 106 may determine whether a defined circumstance exists in the dynamic environment 107 in real time or substantially real time.

For example, the image data may include a series of frames that depicts the users 112 moving towards one another. The MC module 105 and the AI engine 106 may determine a distance between the users 112 and/or a number of users 112 in the dynamic environment 107. Based on thresholds associated with the distance or the number of users 112, the MC module 105 may determine whether a defined circumstance exists in the dynamic environment 107.

Additionally, the AI engine 106 or the MC module 105 may distinguish one of the users 112 from one of the objects (115 or 109) in the image data, identify motion thereof between a sequence of frames of the image data, identify loading and pickup zones in a region associated with the image or video feed, or some combination thereof.

The thresholds are used to assess the properties relating to operations of the dynamic environment 107 identified from the image data obtained from the camera system 102. For example, the thresholds may include maximum spacing distances between objects placed on warehouse shelves, minimum spacing distances between users 112 and warehouse shelves in motion, social distancing between the users 112, a number of users 112 in a portion of the dynamic environment 107, a maximum loading weight, a minimum loading capacity, a minimum user movement speed, an aisle dimension, or some combination thereof. In some embodiments, the operating thresholds may be configured and adjusted by an administrator to facilitate control of an operation in the dynamic environment 107 and improve efficiency and safety therein.

Additionally or alternatively, the system device 104 may collect information relating to the items in the dynamic environment 107 or the operations performed in the dynamic environment 107. For instance, collected information may relate to, identities of the environment items 115, dimensions of the environment items 115, weights of the environment items 115, working schedule of the users 112, regions of responsibility of the users 112, shelf dimensions, storage location identities, some combination thereof, or any other characteristics of the environment items 115, the dynamic environment 107, or the users 112.

The MC module 105, the AI engine 106, the environment module 111, combinations thereof, and components thereof may be implemented using hardware including a processor, a microprocessor (e.g., to perform or control performance of one or more operations), a field-programmable gate array (FPGA), or an application-specific integrated circuit (ASIC). In some other instances, MC module 105, the AI engine 106, the environment module 111, combinations thereof, and components thereof may be implemented using a combination of hardware and software. Implementation in software may include rapid activation and deactivation of one or more transistors or transistor elements such as may be included in hardware of a computing system (e.g., the system device 104 or the user device 113 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the designations of different elements in the manner described is meant to help explain concepts described herein and is not limiting. For instance, in some embodiments, the camera system 102, the dynamic environment 107, the system device 104, the AI engine 106, and the network 108 are delineated in the specific manner described to help with explaining concepts described herein but such delineation is not meant to be limiting. Further, the operating environment 100 may include any number of other elements or may be implemented within other systems or contexts than those described.

Figure 2:
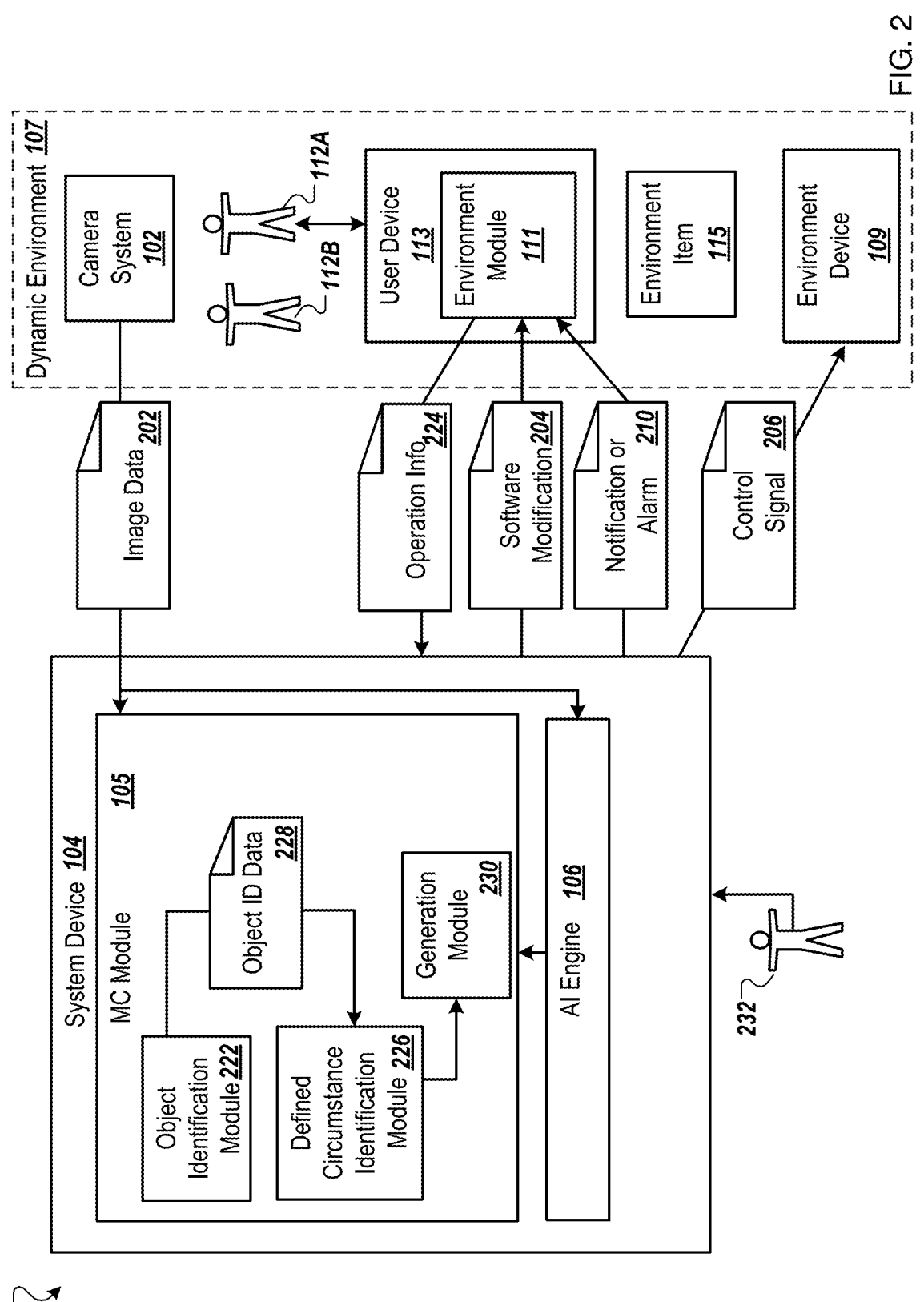
FIG. 2 is a diagram of an example monitor and control process that may be implemented in the operating environment of FIG. 1.

FIG. 2 depicts an example monitor and control process 200 (MC process), which may be implemented in an operating environment such the operating environment 100 of FIG. 1 or another suitable operating environment. The MC process 200 of FIG. 2 includes some components (e.g., 104, 105, 106, 107, 102, 112, 113, 111, 115, and 109) of the operating environment 100. Although not depicted, it may be understood that communication of data and information in the MC process 200 may via a network such as the network 108 of FIG. 1.

In the MC process 200, image data 202 collected by the camera system 102 may be obtained by the system device 104. For example, the image data 202 may be obtained by the AI engine 106 and/or the MC module 105. The image data 202 may include a video feed of a portion of the dynamic environment 107. Additionally or alternatively, the image data 202 may include images (e.g., still images) or any other visual data (e.g., infrared, thermal energy, etc.).

The camera system 102 may be directed towards or be configured to capture the image data 202 from at least a portion of the dynamic environment 107. For instance, the camera system 102 may be positioned in the dynamic environment 107 such that one or both of the users 112 are monitored during an operation performed in the dynamic environment 107 or may be positioned in the dynamic environment 107 to monitor the environment item 115, the users 112, the environment device 109, or some combination thereof.

The image data 202 may be communicated to an object identification module 222 included in the MC module 105. The object identification module 222 may be configured to identify objects (e.g., 112, 113, 111, 115, and 109) in the image data 202. The object identification module 222 may implement human detection operations or applications, motion detection operations or applications, etc. Some examples of motion and human detection applications may include Viola-Jones object detection, scale-invariant feature transform, histogram of oriented gradients, region proposals, single shot multibox detectors, YOLOv3, RentinaNet, and the like. In some embodiments, the object identification module 222 may use the AI engine 106. For instance, some of the object detection applications may use a neural network, which may be configured in the AI engine 106.

The object identification module 222 may identify one or more objects of the image data 202. For instance, object identification module 222 may detect a first object such as one of the users 112 and a second object such as the environment device 109 in the image data 202. Object identification data 228 may be communicated to a defined circumstance identification module 226.

The defined circumstance identification module 226 may be configured to determine whether a property is present in the image data 202 and determine whether the property exceeds a particular threshold. Some examples of the property may include a distance between the one of the users 112 and the environment device 109, movement of the environment item 115 relative to another environment item 115 on a background object, a distance between the users 112, a total weight of environment items 115 on a shelf, a removal of the environment item 115 from the dynamic environment 107, a number of users 112 in the dynamic environment 107, a speed of motion of one of the users 112; the user device 113, the environment item 115, the environment device 109, other properties, or combinations thereof.

The property may have a threshold associated with it. For instance, the property may include distance between the users 112 and the threshold associated with it may be a particular distance such as six feet (two meters). Similarly, the property may be the total weight of the environment item 115 on a shelf, and the threshold associated with it may be a particular mass such as one hundred kilograms. Similarly still, the property may include removal of the environment item 115 from the dynamic environment 107 and the associated threshold may be simply removal of the environment item 115 or a number of environment items 115 removed from the dynamic environment 107 in a particular time (e.g., thirty minutes).

Responsive to the property being in excess of the associated threshold, the defined circumstance identification module 226 may determine that the defined circumstance exists in the dynamic environment 107. For instance, the presence of the property that exceeds the threshold may indicate, at least partially, that the defined circumstance exists in the dynamic environment.

The defined circumstance may include a circumstance in which the MC module 105 is configured to control an aspect of the dynamic environment 107. The defined circumstance may include a dangerous situation, which may be mitigated by the MC module 105 by stopping a piece of equipment and/or alerting one of the users 112. Additionally, the defined circumstance may include an inefficiency of an operation in the dynamic environment 107, which the MC module 105 may control or change to reduce the inefficiency. Additionally still, the defined circumstance may include a situation in which an environment application such as the environment module 111 may be supplemented or improved.

The defined circumstance identification module 226 may also receive input from the environment module 111 in some embodiments. For instance, operation information 224 may be communicated from the environment module 111 to the system device 104. The operation information 224 may include feedback from the user device 113 as the first user 112A performs an operation in the dynamic environment 107. An example of the operation information 224 may include data communicated to a telnet server in an inventory management system or may be sensor information (e.g., locational information, physical condition, etc.) gathered by the user device 113. The defined circumstance identification module 226 may correlate the operation information 224 to other information derived from the image data 202.

Additionally, in some embodiments, the defined circumstance identification module 226 may perform motion analysis based on the object identification data 228. For instance, the defined circumstance identification module 226 may identify a first frame. The first frame may be identified in the image data 202 that includes one or more objects. The defined circumstance identification module 226 may determine object types of the objects in the first frame. The object type may include a human (e.g., the users 112), a piece of equipment (e.g., the environment device 109), a shelf, a box, (e.g., the environment item 115) temporarily stored in a dynamic environment 107, a background object such as a door, a platform, a hallway, etc.

The defined circumstance identification module 226 may determine a first position of one of the objects relative to another of the objects in the first frame. The defined circumstance identification module 226 may identify a second frame in the image data 202, which is usually a later frame of the image data 202, that includes the objects. The defined circumstance identification module 226 may then verify the identity of the objects in the second frame.

The defined circumstance identification module 226 may determine a second position of one of the objects relative to another of the objects in the second frame. The defined circumstance identification module 226 may then determine a difference between the first position and the second position. The difference may be indicative of motion of one of the objects relative to another object and may be indicative of the threshold that triggers identification of the defined circumstance.

In some embodiments, the defined circumstances may be loaded by an administrator 232. For instance, the administrator 232 may define a threshold such as a social distance between the users 112 as six feet. The defined circumstance may also be loaded from a similar dynamic environment. For instance, a threshold such as a safety distance between one of the users 112 and the environment device 109 of three feet may be implemented in another smart warehouse may be implemented in the dynamic environment 107. Additionally, the defined circumstance or the thresholds may be learned by the AI engine 106. For instance, the AI engine 106 may receive the image data 202 and update and modify thresholds, which may create or update the thresholds at which the MC module 105 controls an object in the dynamic environment 107.

Responsive to the defined circumstance being present in the dynamic environment 107, a generation module 230 may generate a control signal 206, a software modification 204, a notification or alarm 210, or combinations thereof (collectively, control signals). The control signal may be configured to mitigate or otherwise address the defined circumstance. The control signal may be communicated to one or more components (111, 113, or 109) of the dynamic environment 107. For instance, the control signal 206 may be communicated to the user device 113 or the environment device 109 such that an operational state of the user device 113 or the environment device 109 is modified. A modification to the operational state may bring the property within the threshold or may prevent the property from further exceeding the threshold.

For instance, if the defined circumstance may include the users 112 being within a social distance. In response the notification or alarm 210 may be communicated to the environment module 111 of the user device 113 to remind the first user 112A to move. If the defined circumstance is a safety issue in which the second user 112B is in danger of being injured by the environment device 109, then the control signal 206 may control the environment device 109 to stop or slow it. If the defined circumstance is a motion of the environment item 115 from a first shelf to a second shelf, the control signal may include an update to the environment module 111 such as an update of a location associated with the environment item 115. If the defined circumstance is an inefficient sequence in an operation performed by the first user 112A in the dynamic environment 107, the software modification 204 may include a modification to a sequence of screens that direct the operation.

Figure 3A:
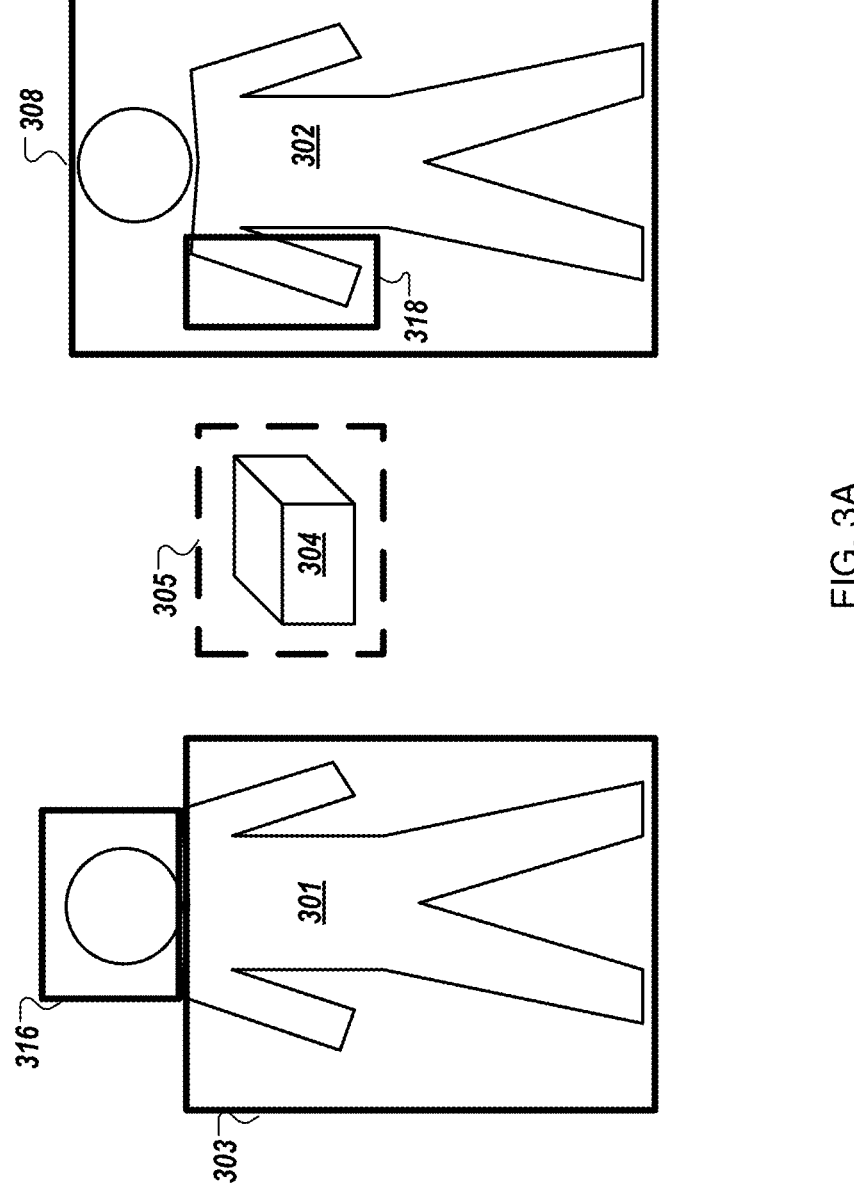
FIG. 3A is a first example use case of the monitor and control process of FIG. 2.

FIG. 3A is a first example use case 300 of the MC process 200 of FIG. 2. The first use case 300 depicts a frame of the image data and includes a first human 301, a second human 302, and an object 304 located in a portion of a dynamic environment. The first use case 300 may include motion detection and object identification of the humans 301 and 302 and the object 304. Additionally, the first use case 300 may detect a movement of the object 304 between the humans 301 and 302.

An AI system, such as the AI engine 106 as described with respect to FIG. 1, that obtains the image data or the frame that represents the first use case 300 may generate bounding boxes 303, 305, and 308 around sections of the image or the frame in which the humans 301 and 302, the object 304, or motions thereof are detected. The AI system may be trained to distinguish the humans 301 and 302 from the object 304 and any corresponding motions of the humans 301 and 302 from the motions of the object 304.

In FIG. 3A, a first bounding box 316 may be generated in proximity to a head of the first human 301 in response to movement of this portion of the frame (e.g., turning of the head, movement of facial features, or another movement relating to the head) and a second bounding box 303 may be generated in proximity to a body of the first human 301 in response to the body moving in the frame (e.g., movement of appendages, rotating of hips, or any other body movements). A third bounding box 318 in proximity to a hand of the second human 302 may be generated in response to movement in the corresponding portion of the frame (e.g., finger movement, wrist rotation, or any other hand movements) and a fourth bounding box 308 in proximity to a body of the second human 302 may be generated in response to motion of the body of the second human 302. A human-motion bounding box may be generated by combining the first, the second, the third, and the fourth bounding boxes 303, 316, 318, and 308.

Additionally, the object 304 being passed between the first human 301 and the second human 302 may be detected. A fifth bounding box 305 in proximity to the object 304 may be generated in response to detection of motion of the object 304. The fifth bounding box 305 may represent motion of the object 304, which may be delineated as an object-motion bounding box 305. A MC module such as the MC module 105 may monitor the fifth bounding box 305 along with the human-motion bounding box to determine whether a property (such as weight of the object 304, position of the object 304, improper handling of the object 304, etc.) exceeds a threshold and triggers a defined circumstance. In response to the defined circumstance existing in the dynamic environment, the MC module 105 may generate a control signal to mitigate or address the dynamic environment.

In some embodiments, the human-motion bounding box 303 and the object-motion bounding box 305 may be visually depicted to facilitate distinguishing between the two types of bounding boxes 303 and 305. As illustrated in the first example use case 300, the human-motion bounding box 303 includes a solid line, while the object-motion bounding box 305 includes a dashed line. Additionally or alternatively, the bounding boxes 303 and 305 may be distinguished by different outline colors, different outline weights, or any other visual display differences.

Figure 3B:
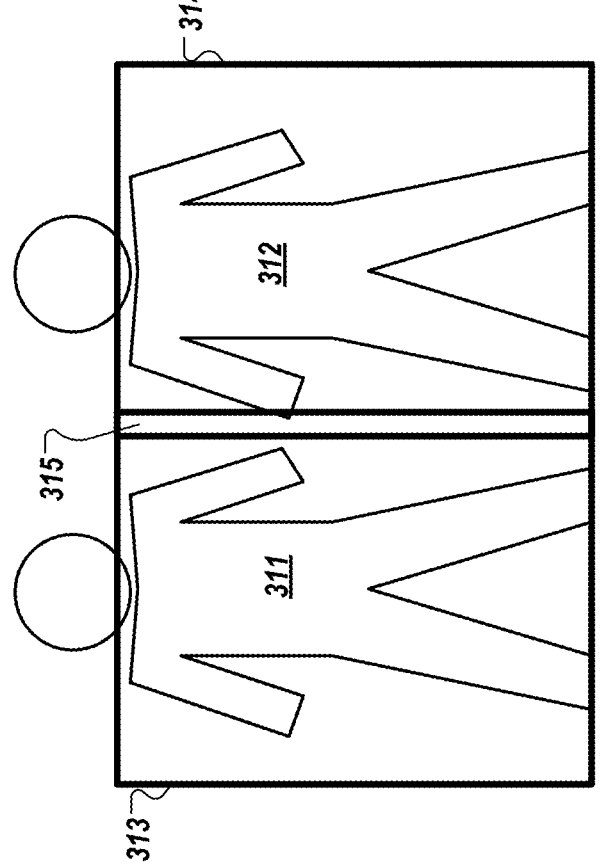
FIG. 3B is a second example use case of the monitor and control process of FIG. 2.

FIG. 3B is a second example use case 310 of the MC process 200 of FIG. 2. In the second use case 310 involves a first human 311 and a second human 312 walking towards one another. The first human 311 may be outlined by a first bounding box 313 and the second human 312 may be outlined by a second bounding box 314.

In the second use case 310 a defined circumstance may be determined to exist in response to the first human 311 being too close to the second human 312. For instance, in FIG. 3B the first bounding box 313 may overlap 315 with the second bounding box 314. Responsive to determining that the first human 311 and the second human 312 are too close, the MC module may determine that a defined circumstance exists and may generate a notification or control signal. The notification of the control signal may be communicated to one or both of the humans 311 and 312, may be communicated to a speaker system of the dynamic environment, etc. The notification may cause a visual, an audio, a tactile, or other signal to be emitted in the warehouse or on a user device of the humans 311 and/or 312 to warn them.

The first bounding box 313 and the second bounding box 314 may include a clearance distance. The clearance distance may extend beyond the detected first human 311 and second human 312 by a defined value. Accordingly, the first bounding box 313 and the second bounding box 314 may be defined to be larger than the actual size of the humans 311 and 312 or movement thereof. The clearance distance may increase a distance between the humans 311 and 312 because the bounding boxes 313 and 314 interfere when the humans 311 and 312 are farther from one another.

In some embodiments, the clearance distance may be set by an administrator. For instance, the administrator may be a person or group of individuals that supervises the dynamic environment. The clearance distance may enable selection of a distance between the humans 311 and 312, which may enable social distancing or other safety considerations. By increasing the clearance distance, the expected distance between the humans 311 and 312 may be increased, while decreasing the clearance distance may indicate that a shorter distance between the humans 311 and 312 is acceptable.

Figure 3C:
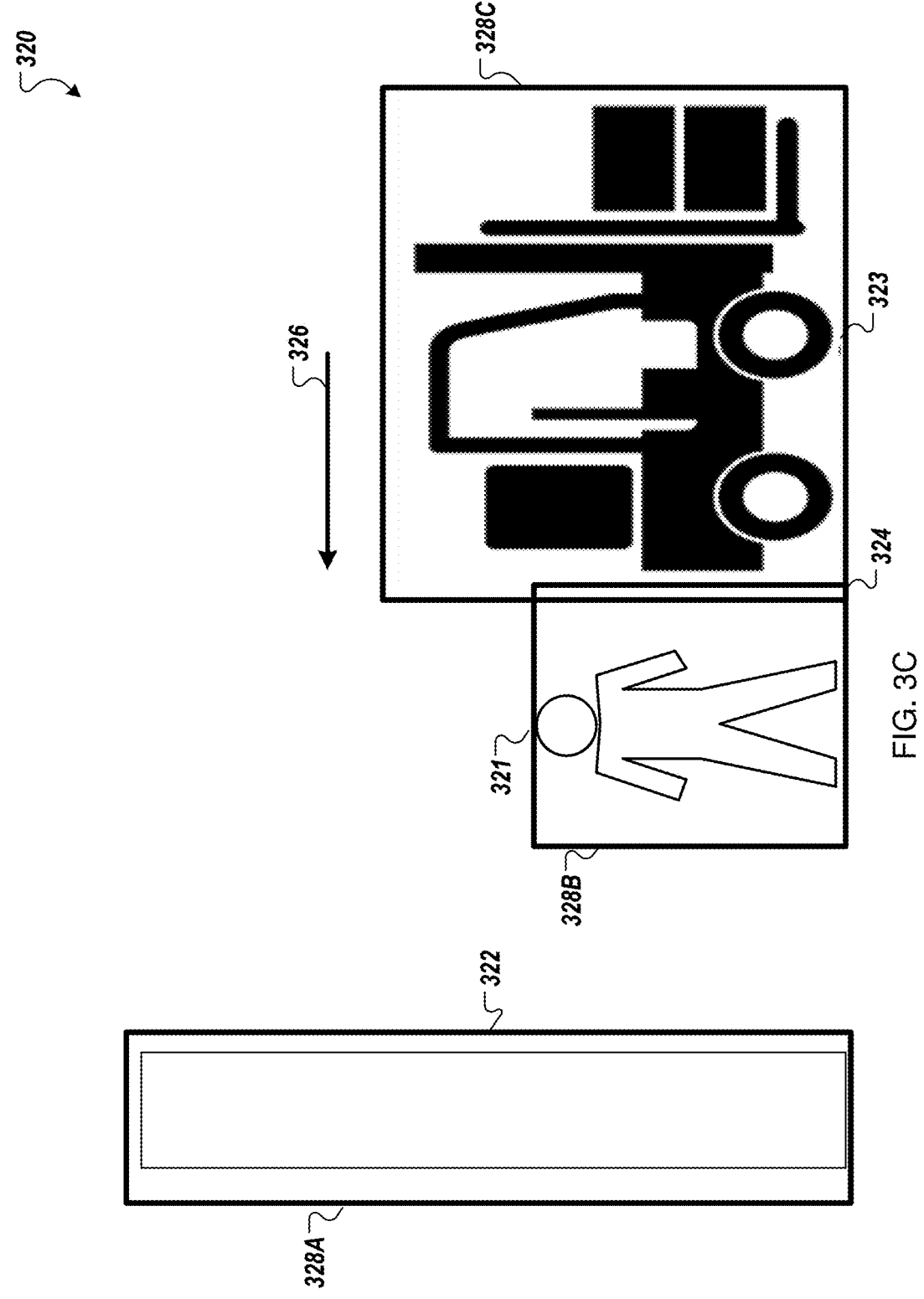
FIG. 3C is a third example use case of the monitor and control process of FIG. 2.

FIG. 3C is a third example use case 320 of the MC process 200 of FIG. 2. The third use case 320 may include a human 321, a first hazardous object 322, and a second hazardous object 323. The human 321 may be an example of the user 112, the first hazard object may be an example of the environment item 115, and the second hazardous object 323 may be an example of the environment device 109. The first hazard object 322 may represent a wall, a shelf, or another structure. The second hazard object 323 may represent a piece of equipment that is moving towards the human 321 in a direction represented by arrow 326.

The human 321, the first hazard object 322, and the second hazard object 323 may be framed by bounding boxes 328A-328C (generally, bounding boxes 328 or bounding box 328). The bounding boxes 328 represent boundaries of the human 321, the first hazard object 322, and the second hazard object 323 and their respective movements.

In the third use case 320, a first bounding box 328A of the first hazardous object 322 does not overlap with a second bounding box 328B of the human 321. Accordingly, a defined circumstance may not exist that involves the first hazardous object 322 and the human 321. Additionally, no notifications or control signals are generated or sent to the warehouse regarding safety concerns associated with the first hazard object 322.

In contrast, a third bounding box 328C of the second hazardous object 323 overlaps with the second bounding box 328B. Accordingly, a defined circumstance may exist that involves the second hazardous object 323 and the human 321. In response to the defined circumstance existing, a control signal and/or a notification may be generated and transmitted to the human 321 and/or the second hazardous object 323. For instance, an MC module such as the MC module 105 of FIGS. 1 and 2, may communicate a notification to the human 321 or a user device associated with the human 321 as well as a control signal that stops the motion of the second hazardous object 323 in the direction 326 of the human 321.

Figure 4:
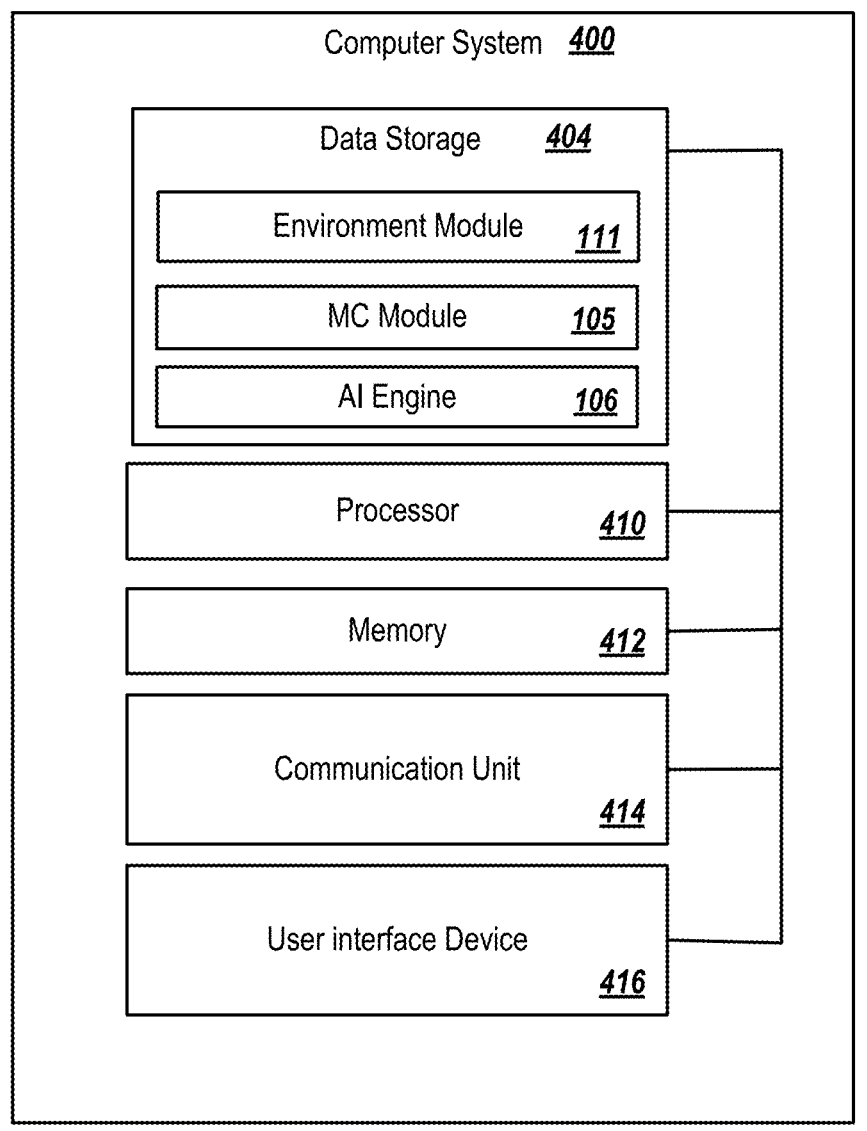
FIG. 4 is an example computing system configured for monitor and control processes.

FIG. 4 illustrates an example computing system 400 configured for real time monitor and control of a dynamic environment according to at least one embodiment of the present disclosure. The computing system 400 may be implemented in the operating environment 100 of FIG. 1, for instance. Examples of the computing system 400 may include the system device 104, the user device 113, the environment item 115, the environment device 109, the camera system 102, or some combination thereof. The computing system 400 may include one or more processors 410, a memory 412, a communication unit 414, a user interface device 416, and a data storage 404 that includes the environment module 111, the MC module 105, and the AI engine 106 (collectively, modules 111/106/105).

The processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 4, the processor 410 may more generally include any number of processors configured to perform individually or collectively any number of operations described in the present disclosure. Additionally, one or more of the processors 410 may be present on one or more different electronic devices or computing systems. In some embodiments, the processor 410 may interpret and/or execute program instructions and/or process data stored in the memory 412, the data storage 404, or the memory 412 and the data storage 404. In some embodiments, the processor 410 may fetch program instructions from the data storage 404 and load the program instructions in the memory 412. After the program instructions are loaded into the memory 412, the processor 410 may execute the program instructions.

The memory 412 and the data storage 404 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 414 may include one or more pieces of hardware configured to receive and send communications. In some embodiments, the communication unit 414 may include one or more of an antenna, a wired port, and modulation/demodulation hardware, among other communication hardware devices. In particular, the communication unit 414 may be configured to receive a communication from outside the computing system 400 and to present the communication to the processor 410 or to send a communication from the processor 410 to another device or network (e.g., 108 of FIG. 1).

The user interface device 416 may include one or more pieces of hardware configured to receive input from and/or provide output to a user. In some embodiments, the user interface device 416 may include one or more of a speaker, a microphone, a display, a keyboard, a touch screen, or a holographic projection, among other hardware devices.

The modules 111/106/105 may include program instructions stored in the data storage 404. The processor 410 may be configured to load the modules 111/106/105 into the memory 412 and execute the modules 111/106/105. Alternatively, the processor 410 may execute the modules 111/106/105 line-by-line from the data storage 404 without loading them into the memory 412. When executing the modules 111/106/105 the processor 410 may be configured to perform a participation verification process as described elsewhere in this disclosure.

Modifications, additions, or omissions may be made to the computing system 400 without departing from the scope of the present disclosure. For example, in some embodiments, the computing system 400 may not include the user interface device 416. In some embodiments, the different components of the computing system 400 may be physically separate and may be communicatively coupled via any suitable mechanism. For example, the data storage 404 may be part of a storage device that is separate from a server, which includes the processor 410, the memory 412, and the communication unit 414, that is communicatively coupled to the storage device. The embodiments described herein may include the use of a special-purpose or general-purpose computer including various computer hardware or software modules, as discussed in greater detail below.

Figure 5:
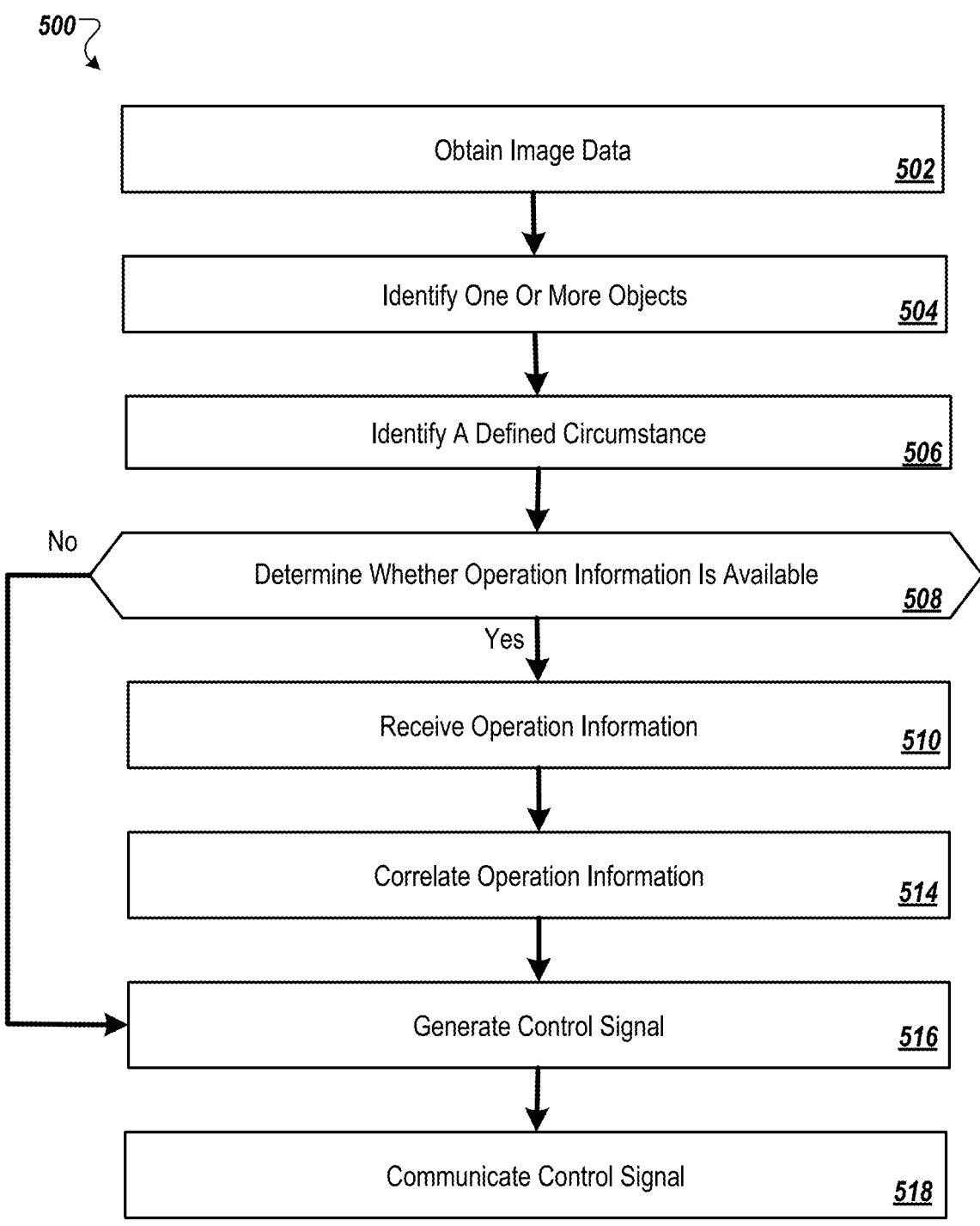
FIG. 5 is a flowchart of an example method of monitor and control of a dynamic environment.

FIG. 5 is a flow chart of an example method 500 of real time monitor and control of a dynamic environment, according to at least one embodiment of the present disclosure. The method 500 may be performed in any suitable operating environment such as the operating environment 100 of FIG. 1. One or more operations of the method 500 may be performed by a computing device such as the system device 104, the AI engine 106, the computing system 400 of FIG. 4 or another suitable system, apparatus, or device.

The method 500 may begin at block 502 in which image data may be obtained. The image data may be obtained from a camera system. The camera system may be directed towards or be configured to capture the image data from at least a portion of a dynamic environment. The image data may include a video feed, an image feed, multiple frames, and the like.

The dynamic environment may include a space in which multiple objects may move and change position. In the dynamic environment, movement of objects may create dangerous situations, and may make evaluation of operations difficult to evaluate. Some examples of the dynamic environment include a smart warehouse, a medical facility, or a shopping center.

At bock 504, one or more objects may be identified. For instance, a first object and a second object may be identified in the image data. In some embodiments the first object and the second object are identified by an AI engine such as the AI engine 106 of FIG. 1. In these and other embodiments, the objects may be identified using human detection operations, object detection operations, and the like.

At block 506, a defined circumstance may be identified. For instance, it may be determined whether a property is present in the image data that exceeds a particular threshold. Responsive to the property being present that exceeds the threshold, the defined circumstance may be identified that exists in the dynamic environment. For instance, presence of the property that exceeds the threshold may indicate, at least partially, that the defined circumstance exists in the dynamic environment.

For example, the threshold may include a maximum spacing distance between the first object and the second object, a maximum spacing distance between the first object and the second object on a warehouse shelf, a minimum spacing distance between a first user and the first object or the second object, a social distance between users in the dynamic environment, a maximum load imposed by the first object on the second object, a minimum load imposed by the first object on the second object a minimum movement speed of the first object relative to the second object, a minimal free space relative to the first object or the second object, or combinations thereof. Each of the thresholds may be indicative of a particular defined circumstance. In some embodiments the identifying that the defined circumstance exists includes motion detection, object tracking, human detection, object proximity assessment, quantity detection, or combinations thereof. Additionally or alternatively, in some embodiments the identifying that the defined circumstance exists includes analyzing motion of objects relative to one another such as motion of the first object relative to the second object. Some additional details of an example method of analyzing motion of objects are provided with reference to FIG. 7.

At block 508 it may be determined whether operation information is available from a user device. For instance, it may be determined whether the user device associated with a first user, who is at least temporarily present in the dynamic environment, is communicating operation information. In response to the operation information being available ("YES" at block 508), the method 500 may proceed to block 510. In response to the operation information not being available ("NO" at block 508), the method 500 may proceed to block 516.

At block 510, the operation information may be received. The operation information may be received from the user device associated with the first user. The operation information may include data reflecting performance of an operation by the first user in the dynamic environment. At block 514, the operation information may be correlated with the identified objects. For instance, the operation information may be correlated with the first and the second objects identified in the image data. In some embodiments, motion of the first and the second objects might be verified or more accurately identified using the operation information. For instance, the operation information may include barcode data read from the user device. The barcode data may be parsed and correlated to the first object identified in the image data.

At block 514, a control signal may be generated. The control signal may be configured to mitigate the defined circumstance. At block 516, the control signal may be communicated. For instance, the control signal may be communicated to a device related to the first object such that an operational state of the first object is modified to bring the property within the operating threshold.

For instance, if the defined circumstance may include two users being within a social distance, then the control signal may include an alarm or notification communicated to a user device of one of the users. If the defined circumstance is a safety issue in which a user is in danger of being hit by a machine, then the control signal may control the machine to stop or slow the machine and an alarm or notification communicated to the user. If the defined circumstance is a motion of an item from a first shelf to a second shelf, the control signal may include an update to a telnet server that updates a location associated with the item. If the defined circumstance is an inefficient sequence in an operation performed by a user in the dynamic environment, the control signal may include a modification to a sequence of screens that direct the operation.

Figure 6:
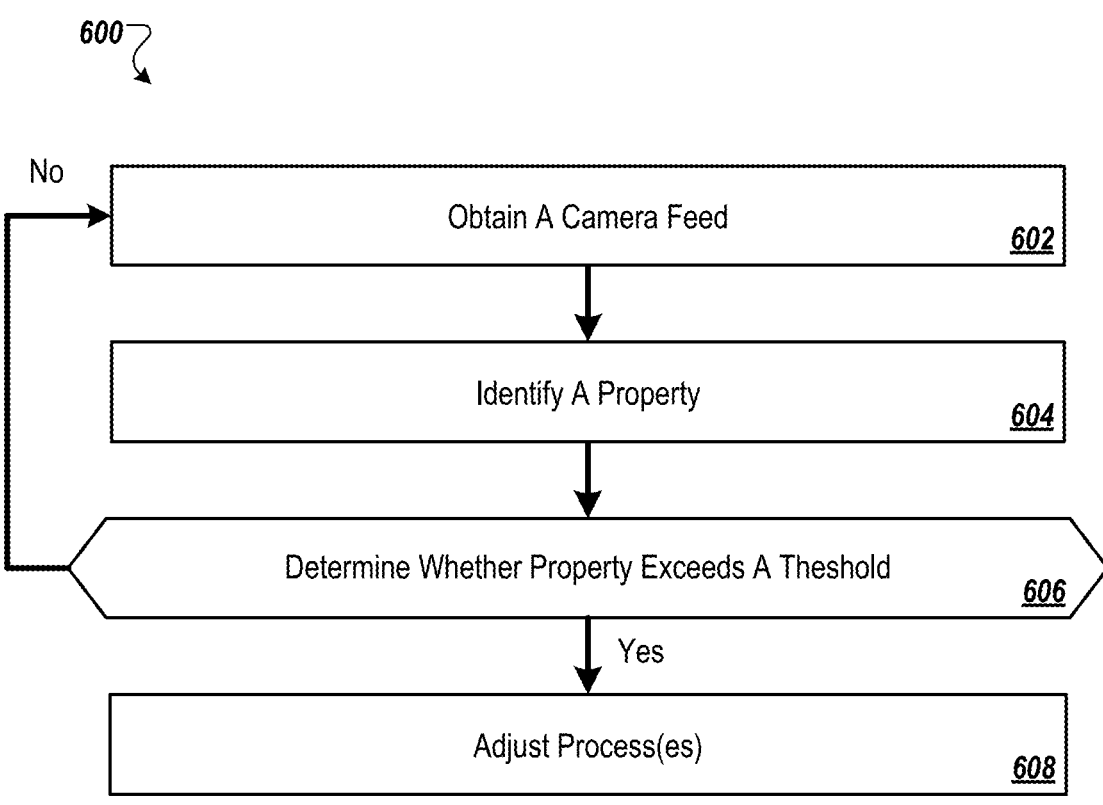
FIG. 6 is a flowchart of an example method of processing information from one or more camera feeds to adjust one or more processes of a warehouse operation.

FIG. 6 is a flowchart of an example method 600 of processing information from one or more camera feeds to adjust one or more processes of a warehouse operation according to at least one embodiment of the present disclosure. The method 600 may be performed in any suitable operating environment such as the operating environment 100 of FIG. 1. One or more operations of the method 600 may be performed by a computing device such as the system device 104, the AI engine 106, the computing system 400 of FIG. 4 or another suitable system, apparatus, or device.

The method 600 may begin at block 602, in which a camera feed directed toward a warehouse operation may be obtained. The camera feed may include images or videos of one or more regions in a warehouse corresponding to where camera systems are directed. In some embodiments, a camera system may be directed towards a shelf on which items in the warehouse may be placed such that the camera feed includes changes in quantities or identities of items placed on the shelf. In these and other embodiments, a camera system may be directed towards aisles, hallways, or other locations in the warehouse in which human warehouse operators may pass through such that the camera feed portrays the movement of the human warehouse operators and objects carried by the human warehouse operators.

At block 604, a property relating to the warehouse operation may be identified by an artificial intelligence system. The artificial intelligence system may be trained using computer vision training methods to identify movement between images, distinguish between humans and objects included in an image, determine distances between moving humans or objects, or some combination thereof. In some embodiments, the property relating to the warehouse operation may involve information that the artificial intelligence system determines from one or more images or frames of a video included in the camera feed. For example, the property may include the categorization of one or more detected entities in the camera feed as humans or objects. As additional or alternative examples, the property may include a motion bounding box that represents existing and projected movement of a human or object, a distance between two or more humans or objects, a quantity of humans or objects, or some combination thereof.

At block 606, whether the property exceeds one or more operating thresholds relating to the warehouse operation may be determined. In some embodiments, the operating thresholds may involve maximum or minimum conditions in which the warehouse operation may proceed as determined by an administrator that is managing the warehouse operation. For example, the operating thresholds may include maximum quantities of objects allowed in a region (e.g., placed on a shelf or loaded on a pallet), a maximum loading weight allowed in a region, a minimum allowable distance between warehouse operators, a minimum walking speed of the warehouse operators, a minimum allowable distance between warehouse operators and hazardous objects identified in the warehouse, a maximum spacing distance between objects positioned in a region, or some combination thereof.

Whether the property exceeds the one or more operating thresholds may be a direct quantitative comparison between the property and a relevant operating threshold. For example, a property may involve a quantity of objects identified on a shelf, while an operating threshold may involve a maximum allowable load in a loading dock. The property may be translated to be comparable to the operating threshold, such as by receiving information regarding the weight of each of the identified objects.

At block 608, one or more processes relating to the warehouse operation may be adjusted to bring the property within the one or more operating thresholds responsive to the property exceeding the one or more operating thresholds. In some embodiments, different processes relating to the warehouse operation may have an effect on the property identified by the artificial intelligence system. For example, a property may include the number of objects loaded on a pallet, and the property may be nearing or exceeding a maximum allowable loading weight of the pallet. A process may involve loading or unloading the pallet, and the process may be adjusted by sending a message to a warehouse operator responsible for the loading or unloading of the pallet to stop adding objects to the pallet or remove some items from the pallet. Additionally or alternatively, the process may be adjusted by autonomously instructing a robotic pallet mover to transport the pallet away responsive to determining that the maximum allowable loading weight of the pallet is reached based on the quantity of objects loaded on the pallet.

In some embodiments, the one or more processes relating to the warehouse operation may be controlled or actuated by one or more Industrial Internet of Things (IIOT) devices. Adjusting the processes relating to the warehouse operation to bring the property within an operating threshold may involve sending instructions to the one or more IIOT devices to perform a task or modify functionality of the one or more IIOT devices. For example, a IIOT device may include an automated pallet-moving vehicle, which may be instructed to transport a pallet from a first location (e.g., a loading dock) to a second location (e.g., to a storage site or a transportation vehicle loading site) in response to the artificial intelligence system determining that the pallet is nearing or at a maximum allowable loading weight.

Figure 7:
FIG. 7 is a flow chart of an example method of analyzing motion, all according to at least one embodiment of the present disclosure.
Figure 7:
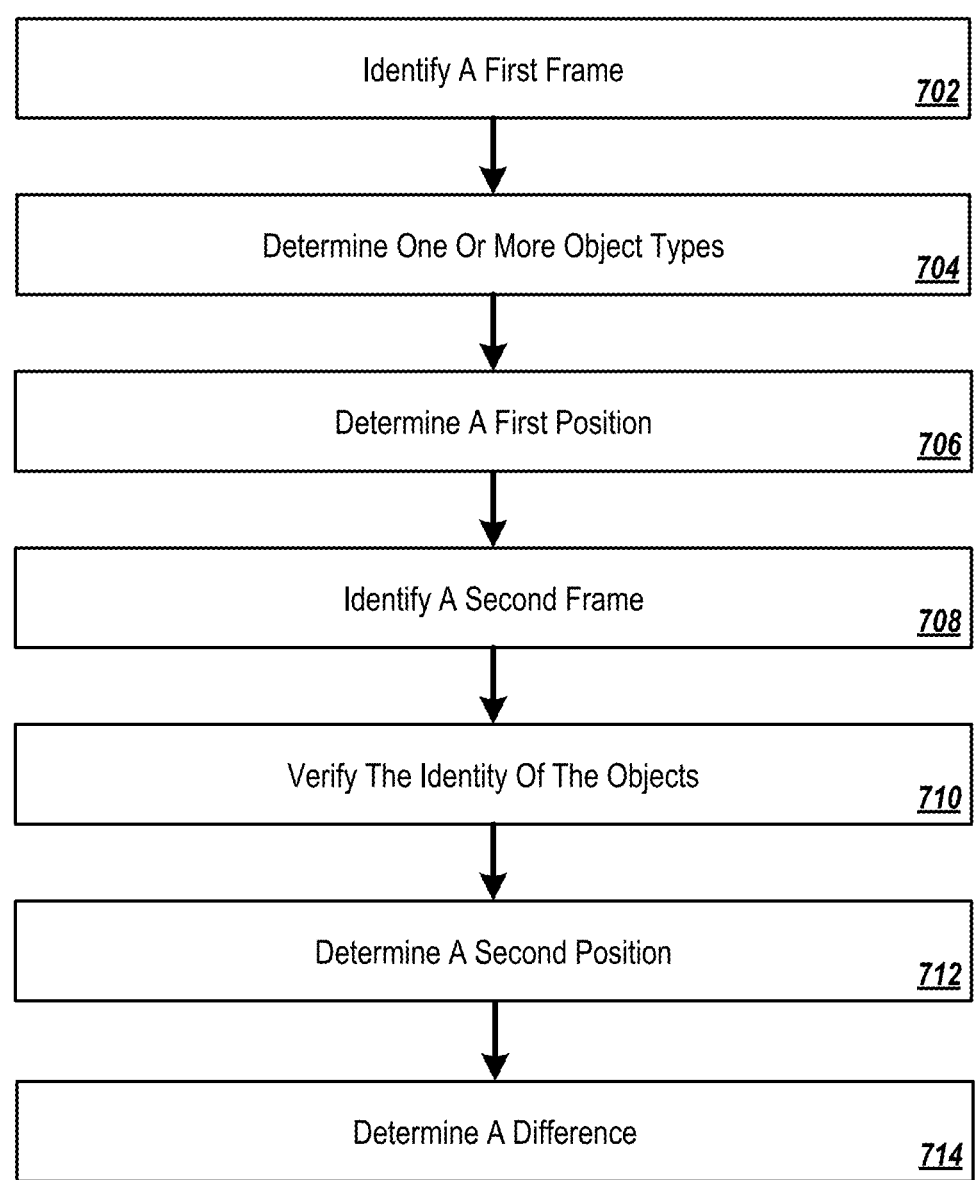

FIG. 7 is a flow chart of an example method 700 of analyzing motion, according to at least one embodiment of the present disclosure. The method 700 may be integrated into another method such as the method 500 of FIG. 5 or the method 600 of FIG. 6. For instance, the method 700 may be performed in block 506 of the method 500 or block 606 of FIG. 6. The method 700 may be performed in any suitable operating environment such as the operating environment 100 of FIG. 1. One or more operations of the method 700 may be performed by a computing device such as the system device 104, the AI engine 106, the computing system 400 of FIG. 4 or another suitable system, apparatus, or device.

The method 700 may begin at block 702 in which a first frame is identified. The first frame may be identified in the image data that includes a first object and a second object. At block 704, one or more object types may be determined. For instance, the object type of the first object and the second object may be determined. The object type may include a human, a piece of equipment such as a forklift, a IOT device, a conveyer belt, a robotic arm, an automated packaging machine, a shelf, a box, an item temporarily stored in a dynamic environment, a background object such as a door, a platform, or a hallway, etc.

At block 706, a first position may be determined. For instance a first position of the first object relative to the second object may be determined in the first frame. At block 708, a second frame may be identified. The second frame may be identified in the image data that includes the first object and the second object. At block 710, the identity of the objects may be verified. For instance, the identity of the first object and the second object may be verified in the second frame.

At block 712, a second position may be determined. For instance, the second position of the first object relative to the second object may be determined in the second frame. At block 714, a difference may be determined. For instance, the difference between the first position and the second position may be determined between the first object relative to the second object. The difference may be indicative of motion of the first object relative to the second object. The difference may also be indicative of the threshold that triggers identification of a defined circumstance.

Although illustrated with discrete blocks, the steps and operations associated with one or more of the blocks of the methods 500, 600, and 700 may be divided into additional blocks, combined into fewer blocks, or eliminated, depending on the particular implementation.

Modifications, additions, or omissions may be made to the methods 500, 600, and 700 without departing from the scope of the disclosure. For example, the designations of different elements in the manner described is meant to help explain concepts described herein and is not limiting. Further, the methods 500, 600, and 700 may include any number of other elements or may be implemented within other systems or contexts than those described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described some embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of real time monitor and control of a dynamic environment, the method comprising:
   obtaining image data from a camera system directed towards a portion of a dynamic environment, wherein the dynamic environment includes a smart warehouse, a medical facility, or a shopping center,
   identifying a first object and a second object in the image data, wherein the first object includes a user device associated with a first user who is at least temporarily present in the dynamic environment;
   analyzing motion of the first object relative to the second object;
   receiving operation information from the user device, wherein the operation information include data reflecting performance of an operation by the first user in the dynamic environment;
   identifying that a defined circumstance exists in the dynamic environment based on presence of a property of in the analyzed motion that exceeds an operating threshold; and
   responsive to the defined circumstance existing in the dynamic environment:
      generating a control signal that is configured to mitigate the defined circumstance, wherein the control signal includes a modification to a sequence of screens that direct the operation; and
      communicating the control signal to a device related to the first object such that an operational state of the first object is modified to bring the property within the operating threshold.

2. The method of claim 1, wherein
the identifying that the defined circumstance exists includes correlating the operation information with the first and the second objects defined in the image data.

3. The method of claim 1, wherein analyzing the motion includes:
   identifying a first frame of the image data that includes the first object and the second object;
   determining an object type of the first object and the second object;
   determining a first position of the first object relative to the second object in the first frame;
   identifying a second frame of the image data that includes the first object and the second verifying the identity of the first object and the second object in the second frame;
   determining a second position of the first object relative to the second object in the second frame; and
   determining a difference between the first position and the second position of the first object relative to the second object.

4. The method of claim 3, wherein the second object includes a background object.

5. The method of claim 1, wherein:
   the first object and the second object are identified by an artificial intelligence (AI) engine;

identifying that the defined circumstance exists is performed using the AI engine; and the AI engine is trained based at least partially on a camera feed from one or both of other periods of time at the dynamic environment and other warehouse operations.

6. The method of claim 1, wherein analyzing the motion includes motion detection, object tracking, human detection, object proximity assessment, or quantity detection.

7. The method of claim 1, wherein the operating threshold includes one or more or a combination of:

a maximum spacing distance between the first object and the second object;

a maximum spacing distance between the first object and the second object on a warehouse shelf;

a minimum spacing distance between a first user and the first object or the second object;

a social distance between users in the dynamic environment;

a maximum load imposed by the first object on the second object; a minimum load imposed by the first object on the second object;

a minimum movement speed of the first object relative to the second object; and a minimal free space relative to the first object or the second object.

8. The method of claim 1, wherein:

the user device includes a terminal emulation application configured to display the modified sequence of screens to the first user.

9. The method of claim 1, wherein:

the first object further includes a first warehouse operator;

the second object includes a second warehouse operator;

the operating threshold includes a social distance between the first warehouse operator and the second warehouse operator; and the control signal further includes an alarm communicated to the user device associated with the first warehouse operator that indicates that the first warehouse operator is within the social distance of the second warehouse operator.

10. A non-transitory computer-readable medium having encoded therein programming code executable by one or more processors to perform or control performance of operations of real time monitor and control of a dynamic environment, the operations comprising:

obtaining image data from a camera system directed towards a portion of a dynamic environment, wherein the dynamic environment includes a smart warehouse, a medical facility, or a shopping center;

identifying a first object and a second object in the image data, wherein the first object includes a user device associated with a first user who is at least temporarily present in the dynamic environment;

analyzing motion of the first object relative to the second object;

receiving operation information from the user device, wherein the operation information include data reflecting performance of an operation by the first user in the dynamic environment;

identifying that a defined circumstance exists in the dynamic environment based on presence of a property of in the analyzed motion that exceeds an operating threshold; and responsive to the defined circumstance existing in the dynamic environment:

generating a control signal that is configured to mitigate the defined circumstance, wherein the control signal includes a modification to a sequence of screens that direct the operation; and communicating the control signal to a device related to the first object such that an operational state of the first object is modified to bring the property within the operating threshold.

11. The non-transitory computer-readable medium of claim 10, wherein the identifying that the defined circumstance exists includes correlating the operation information with the first and the second objects defined in the image data.

12. The non-transitory computer-readable medium of claim 10, wherein analyzing the motion includes:

identifying a first frame of the image data that includes the first object and the second object;

determining an object type of the first object and the second object;

determining a first position of the first object relative to the second object in the first frame;

identifying a second frame of the image data that includes the first object and the second verifying the identity of the first object and the second object in the second frame;

determining a second position of the first object relative to the second object in the second frame; and determining a difference between the first position and the second position of the first object relative to the second object.

13. The non-transitory computer-readable medium of claim 12, wherein the second object includes a background object.

14. The non-transitory computer-readable medium of claim 10, wherein:

the first object and the second object are identified by an artificial intelligence (AI) engine;

identifying that the defined circumstance exists is performed using the AI engine; and the AI engine is trained based at least partially on a camera feed from one or both of other periods of time at the dynamic environment and other warehouse operations.

15. The non-transitory computer-readable medium of claim 10, wherein analyzing the motion includes motion detection, object tracking, human detection, object proximity assessment, or quantity detection.

16. The non-transitory computer-readable medium of claim 10, wherein the operating threshold includes one or more or a combination of:

a maximum spacing distance between the first object and the second object;

a maximum spacing distance between the first object and the second object on a warehouse shelf;

a minimum spacing distance between a first user and the first object or the second object;

a social distance between users in the dynamic environment;

a maximum load imposed by the first object on the second object; a minimum load imposed by the first object on the second object;

a minimum movement speed of the first object relative to the second object; and a minimal free space relative to the first object or the second object.

17. The non-transitory computer-readable medium of claim 10, wherein:

the user device includes a terminal emulation application configured to display the modified sequence of screens to a user, emulation application.

18. The non-transitory computer-readable medium of claim 10, wherein:

the first object further includes a first warehouse operator;

the second object includes a second warehouse operator;

the operating threshold includes a social distance between the first warehouse operator and the second warehouse operator; and the control signal further includes an alarm communicated to the user device associated with the first warehouse operator that indicates that the first warehouse operator is within the social distance of the second warehouse operator.

\* \* \* \* \*